May 31, 1966 R. WEINSTEIN 3,254,199
AUTOMATIC ELECTRIC FLUID HEATING SYSTEM
Filed Sept. 18, 1962

INVENTOR.
RICHARD WEINSTEIN
BY Albert F Kronman
ATTORNEY

United States Patent Office 3,254,199
Patented May 31, 1966

3,254,199
AUTOMATIC ELECTRIC FLUID HEATING SYSTEM
Richard Weinstein, Huntington, N.Y., assignor, by mesne assignments, to Commercial Factors, Ltd., Montreal, Quebec, Canada
Filed Sept. 18, 1962, Ser. No. 224,375
2 Claims. (Cl. 219—309)

This invention relates to an automatic heating system for heating a liquid flowing through a supply system. The invention has particular reference to a protective device which actuates an electric circuit whenever the flow of a fluid through a processing compartment is started or stopped.

The preferred application of the invention is to protect an electric water heater and to cut off the current to the heater whenever the flow of water is stopped. It is obvious that such an arrangement can be used in many other applications involving fluid flow but the invention will be described in relation to the preferred embodiment. Prior art protective devices have been designed and used wherein the passage of current through an electric heater has been controlled by faucets, flow meters, and other mechanical devices which are responsive to the movement of a fluid through a process chamber. The present invention differs from these in that the switch which controls the passage of current through the heater is responsive to the difference in pressure between an input conduit and an exit conduit. The invention has many novel features which will be expained in detail hereinafter.

One of the objects of this invention is to provide an improved automatic heating system which avoids one or more of the disadvantages and limitations of prior art arrangements.

Another object of the invention is to protect a fluid heating system from excessive temperatures and high pressures.

Another object of the invention is to increase the speed of reaction of a switching system to a change of pressure.

Another object of the invention is to isolate the switch components from the liquid in the system.

Another object of the invention is to eliminate switching failure because of entrapped air or solid particles in the fluid.

Another object of the invention is to increase the life of fluid switching systems.

One feature of the invention includes a switch assembly which is actuated by a difference in fluid pressure between two adjoining chambers. The switch assembly comprises a resilient diaphragm which separates the chambers and which is adapted to be displaced in response to a pressure difference between the chambers. A permanent magnet is mounted on the diaphragm and moves with it. An electric switch enclosed in a tube is mounted in one of the chambers and is positioned adjacent to the magnet. The switch includes two resiliently mounted ferromagnetic elements which are adapted to make contact when acted upon by the magnetic field of the magnet.

Another feature of the invention includes the use of the above described switching arrangement in a fluid system where an entrance conduit supplies fluid to a processing compartment and an exit conduit conveys the fluid from the compartment. The switch chambers are connected respectively to the entrance and exit conduits and operate the switch when the fluid flow is greater than a predetermined value.

For a better understanding of the present invention, together with other and further objects thereof, reference is made to the following description taken in connection with the accompanying drawings.

Figure 1:
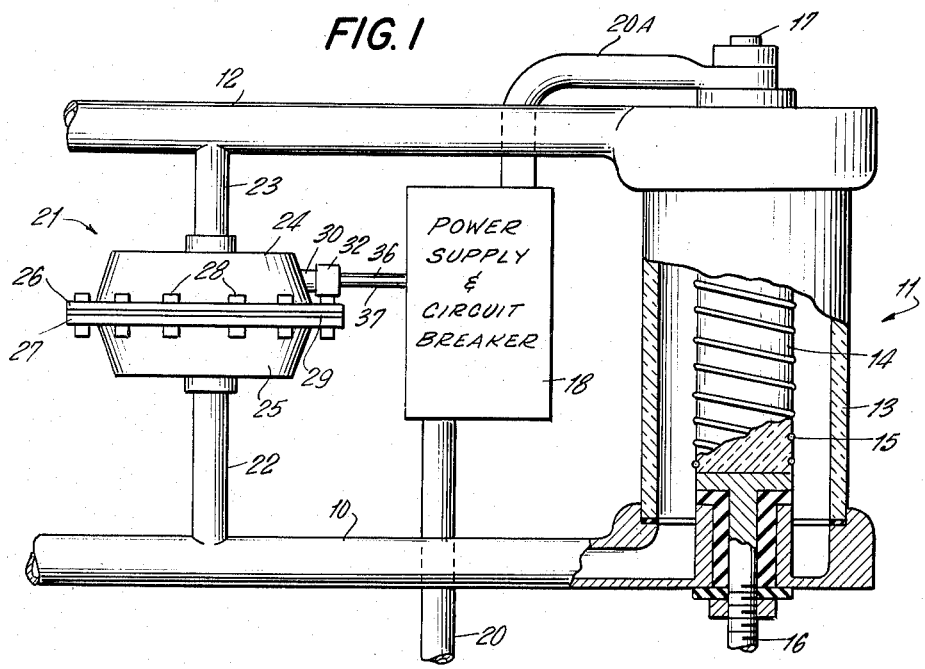
FIG. 1 is a side view of the heating system showing a switch connected to a water heater with parts of the heater shown in section.

Referring now to FIG. 1, the system includes an entrance conduit 10 which conveys fluid to a heater compartment 11 and an exit conduit 12 for conveying the fluid away from the compartment. The heater compartment includes a glass cylinder 13 which encloses a ceramic form 14 wound with resistance wire 15. Suitable terminals 16 and 17 are connected to the resistance wire for external connection to a power supply and a circuit breaker 18.

Electric power is applied to conductor 20 and terminal 16. The circuit breaker 18 being connected in series with either one of these conductors. The switch assembly 21 also has two conduits 22 and 23 and these conduits are respectively connected to conduits 10 and 12 so that the pressures within these conduits are applied to the switch assembly. The switch assembly includes an upper housing 24 and a lower housing 25, both shaped similar to a cap and joined together by flanges 26 and 27. The flanges may be secured to each other by a plurality of bolts 28, as shown in the drawings, but other known forms of sealing such as a turned-over flange or a screw means may be employed. The flanges hold a resilient diaphragm 29 which is flexible enough to be moved a considerable amount by the pressures employed and which divides the interior of the housings into two compartments 24a, 25a. One of the compartments 24a (see FIG. 3) is provided with a switch tube 30 which is shown in detail in FIG. 2. The switch tube is welded at one end to the housing 24 so that the fluid within the compartment 24a cannot reach the inside of the tube and contaminate the switch elements.

Diaphragm 29 may be made of any non-magnetic substance and is preferably a thin Phosphor bronze sheet which is resilient enough to be displaced in a direction normal to its surface when the fluid pressure between the two chambers 24a, 25a, differs by a substantial amount. The diaphragm may be made of brass, plastic, or impregnated fiberglass. At the center of the diaphragm, a magnet 31 is secured. This magnet is adapted to move with the diaphragm and to approach within operating distance of switch tube 30.

Figure 2:
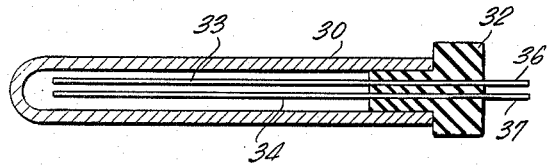
FIG. 2 is a cross sectional view of the switch tube showing the heating system showing a switch element.

The switch tube shown in detail in FIG. 2 includes a non-magnetic hollow cylinder which is closed at one end and contains a plug of insulating material 32 at the other end. Inside the tube two resilient ferromagnetic elements 33 and 34 are mounted in spaced relation and thereby present a normally open pair of contacts. The switch elements are connected to lead-in conductors 36 and 37 which can be connected to any external circuit. In FIG. 1 these conductors are connected to circuit 18 which preferably contains one or more amplifier stages and a circuit breaker or relay which can connect or disconnect conductors 20 and 20A.

Figure 3:
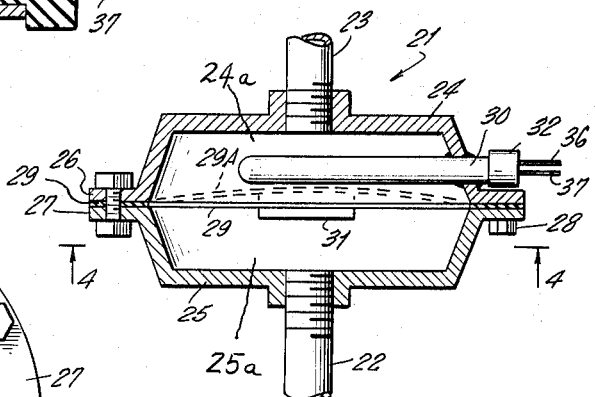
FIG. 3 is a cross sectional view of the switch assembly showing the relative positions of the switch tube, the diaphragm, and the permanent magnet.

The operation of this switch assembly is as follows: When no fluid is flowing through conduits 10 and 12 the pressure in these conduits and in conduits 22 and 23 are equal and the diaphragm 28 is maintained at a neutral position as indicated in FIG. 3. In this position, magnet 31 is far enough away from the elements 33 and 34 so that they remain separated and there is no switching action. Because of this condition, conductors 20 and 20A are disconnected and no current flows through resistance wire 15. Now, let it be assumed that some faucet or other fluid gate is opened to draw the fluid through conduit 12. Since the compartment 11 forms a hydraulic resistance in the fluid line, the pressure in conduits 12 and 23 is less than the upstream pressure in conduits 10 and 22 and for this reason the diaphragm 28 will be displaced to a position 28A shown in dotted lines. This action brings magnet 31 to a position much closer to switch tube 30 and, in this position, its magnetic field causes elements 33 and 34 to be brought together and make contact with each other. This switching action controls the circuit in circuit breaker 18 to join conductors 20 and 20A and send current through resistance wire 15, thereby heating the fluid as it passes through heating compartment 11.

When the flow through conduit 12 is terminated, the pressures in conduits 12 and 10 and also in conduits 23 and 22 are equalized and diaphragm 29 resumes its normal position, thereby opening contacts between elements 33, 34, and thereby breaking the circuit between conductors 20 and 20A. Since the control of the switching action is magnetic and through a sealed tube, there is no necessity of providing a mechanical moving seal through the chamber walls. There are no protruding parts which can be manually moved to change the operation.

Figure 4:
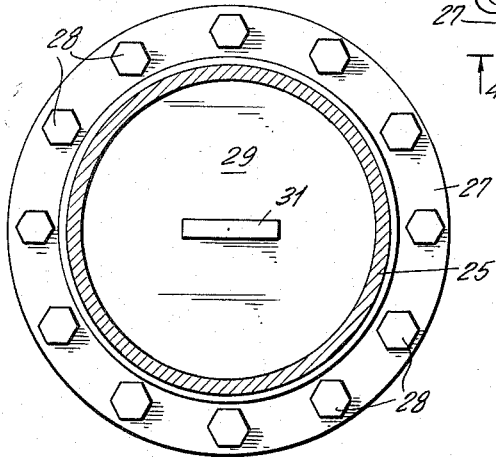
FIG. 4 is a cross sectional view of the switch assembly shown in FIG. 3 and is taken along line 4—4 of that figure.

The diaphragm shown in FIGS. 1 and 3, and 4, depends upon its own resiliency for returning to its normal position. For very high pressures an adjustable spring may be added to the diaphragm to increase its return force or to require a greater pressure before operating the switch wires 33, 34. It should be noted that such an enclosed switch can be made to withstand very high pressures and still be sensitive since the operation of the switch is dependent upon the difference in pressure between the two chambers and not upon the pressure itself. It will be obvious that the conduits can be disposed so that the fluid does not enter the chambers but only compressed air, above the fluid columns 22, 23, is available for opening and closing the contacts.

Having thus fully described the invention, what is claimed as new and desired to be secured by Letters Patent of the United States is:

1. An automatic heating system for heating a fluid only when the fluid is flowing through the system comprising, a first and second chamber enclosed in a pressure housing, a resilient diaphragm secured to the housing wall and separating the chambers at all times, a heater compartment where the fluid may be heated to a desired temperature, a coil of resistance wire within said heater compartment for heating the fluid, a first conduit for conveying fluid to the heater compartment and including a branch conduit to said first chamber, a second conduit for conveying fluid away from the heater compartment and including a second branch conduit to said second chamber, a permanent magnet secured to said diaphragm and adapted to be moved with it, a magnetically operated switch enclosed in a sealed envelope and mounted within one of said chambers adjacent to said magnet, said diaphragm and magnet adapted to be moved by a difference in pressure between said first and second conduits to actuate said switch, a circuit breaker coupled between said switch and said coil of resistance wire, and a source of electrical power connected in series with the circuit breaker and said resistance wire for heating the wire when said switch is actuated.

2. An automatic heating system as claimed in claim 1, wherein said sealed envelope enclosing the switch is mounted within the second chamber and secured to the chamber wall, said switch being normally open but adapted to be closed when the magnet and diaphragm are moved a predetermined distance toward the envelope.

References Cited by the Examiner
UNITED STATES PATENTS

| | | | |
|---|---|---|---|
| 1,645,278 | 10/1927 | Cid | 219—306 |
| 2,207,506 | 7/1940 | Cox | 200—87 X |
| 2,600,309 | 6/1952 | MacDonald et al. | 200—87 |
| 2,892,051 | 6/1959 | Moore | 200—87 |
| 3,042,769 | 7/1962 | Campbell | 200—83 |
| 3,052,776 | 9/1962 | Schomann | 219—332 X |

FOREIGN PATENTS 355,918  9/1961  Switzerland.

RICHARD M. WOOD, *Primary Examiner.*

ANTHONY BARTIS, *Examiner.*